US012563405B2

(12) United States Patent
Swartz et al.

(10) Patent No.: US 12,563,405 B2
(45) Date of Patent: Feb. 24, 2026

(54) AUTOMATED FREQUENCY COORDINATION (AFC) NEGOTIATED BAND ACCESS

(71) Applicant: Cisco Technology, Inc., San Jose, CA (US)

(72) Inventors: John Matthew Swartz, Lithia, FL (US); Jerome Henry, Pittsboro, NC (US); Robert Edgar Barton, Richmond (CA); Matthew Aaron Silverman, Shaker Heights, OH (US); Fred Jay Anderson, Lakeville, OH (US); Vishal Satyendra Desai, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 484 days.

(21) Appl. No.: 17/990,783

(22) Filed: Nov. 21, 2022

(65) Prior Publication Data
US 2024/0171988 A1 May 23, 2024

(51) Int. Cl.
H04W 16/14 (2009.01)
H04W 72/23 (2023.01)
H04W 84/12 (2009.01)

(52) U.S. Cl.
CPC ........... H04W 16/14 (2013.01); H04W 72/23 (2023.01); *H04W 84/12* (2013.01)

(58) Field of Classification Search
CPC ...... H04W 16/16; H04W 72/23; H04W 84/12
See application file for complete search history.

(56) References Cited

U.S. PATENT DOCUMENTS

| | | | | |
|---|---|---|---|---|
| 11,368,853 B2 * | 6/2022 | Khalid | .................. | H04W 8/005 |
| 2008/0279147 A1 * | 11/2008 | Hassan | ................. | H04W 28/18 |
| | | | | 370/330 |
| 2014/0220993 A1 | 8/2014 | Cordeiro et al. | | |
| 2014/0357218 A1 * | 12/2014 | Andrianov | ............ | H04W 16/14 |
| | | | | 455/406 |
| 2016/0066214 A1 * | 3/2016 | Buddhikot | ............ | H04W 16/14 |
| | | | | 455/454 |

(Continued)

FOREIGN PATENT DOCUMENTS

| | | | | | |
|---|---|---|---|---|---|
| WO | WO-2018004641 A1 * | 1/2018 | ............ | H04W 72/56 |
| WO | WO-2020227724 A1 * | 11/2020 | ............ | H04W 16/14 |
| WO | 2021/021016 A1 | 2/2021 | | |

*Primary Examiner* — Shukri Taha
(74) *Attorney, Agent, or Firm* — Edell, Shapiro & Finnan, LLC

(57) ABSTRACT

Presented herein are techniques to allocate use of controlled wireless spectrum. A method includes receiving, from a wireless local area network service provider, a request for wireless local area network spectrum for a future time window, wherein the wireless local area network spectrum is subject to automated frequency coordination, in response to the request, sending, to an incumbent that uses the wireless local area network spectrum, a query consistent with the request for the wireless local area network spectrum for the future time window, receiving, from the incumbent, in response to the query, a grant to use the wireless local area network spectrum for the future time window, and in response to receiving the grant, sending permission to the wireless local area network service provider to use the wireless local area network spectrum for the future time window.

20 Claims, 4 Drawing Sheets

(56) References Cited

U.S. PATENT DOCUMENTS

| | | | | |
|---|---|---|---|---|
| 2016/0197781 A1* | 7/2016 | Smith | ................... | H04L 5/0058 |
| | | | | 370/254 |
| 2019/0191314 A1* | 6/2019 | Mueck | .................. | H04W 16/06 |
| 2020/0137583 A1* | 4/2020 | Economy | .............. | H04W 28/16 |
| 2020/0236558 A1* | 7/2020 | Damnjanovic | ....... | H04W 74/04 |
| 2022/0338017 A1* | 10/2022 | Cimpu | .................. | H04W 16/10 |
| 2023/0122884 A1* | 4/2023 | Tripathi | ................ | H04W 16/14 |
| | | | | 370/329 |
| 2024/0422563 A1* | 12/2024 | Montalvo | .............. | G06N 5/022 |

* cited by examiner

200

| CHANNEL (SPECTRUM) DESIRED | REQUESTOR AND/OR LOCATION | DATE | TIME PERIOD | BID | INCUMBENT NAME OR IDENTIFIER | REQUEST GRANTED? | COUNTER BID |
|---|---|---|---|---|---|---|---|
| 48-56 | LPV AT x, y COORDINATES | 3-15-2022 | 6-11PM | $AAA | ABC, INC. | YES | $BBB |

REQUEST 210

FIG. 2

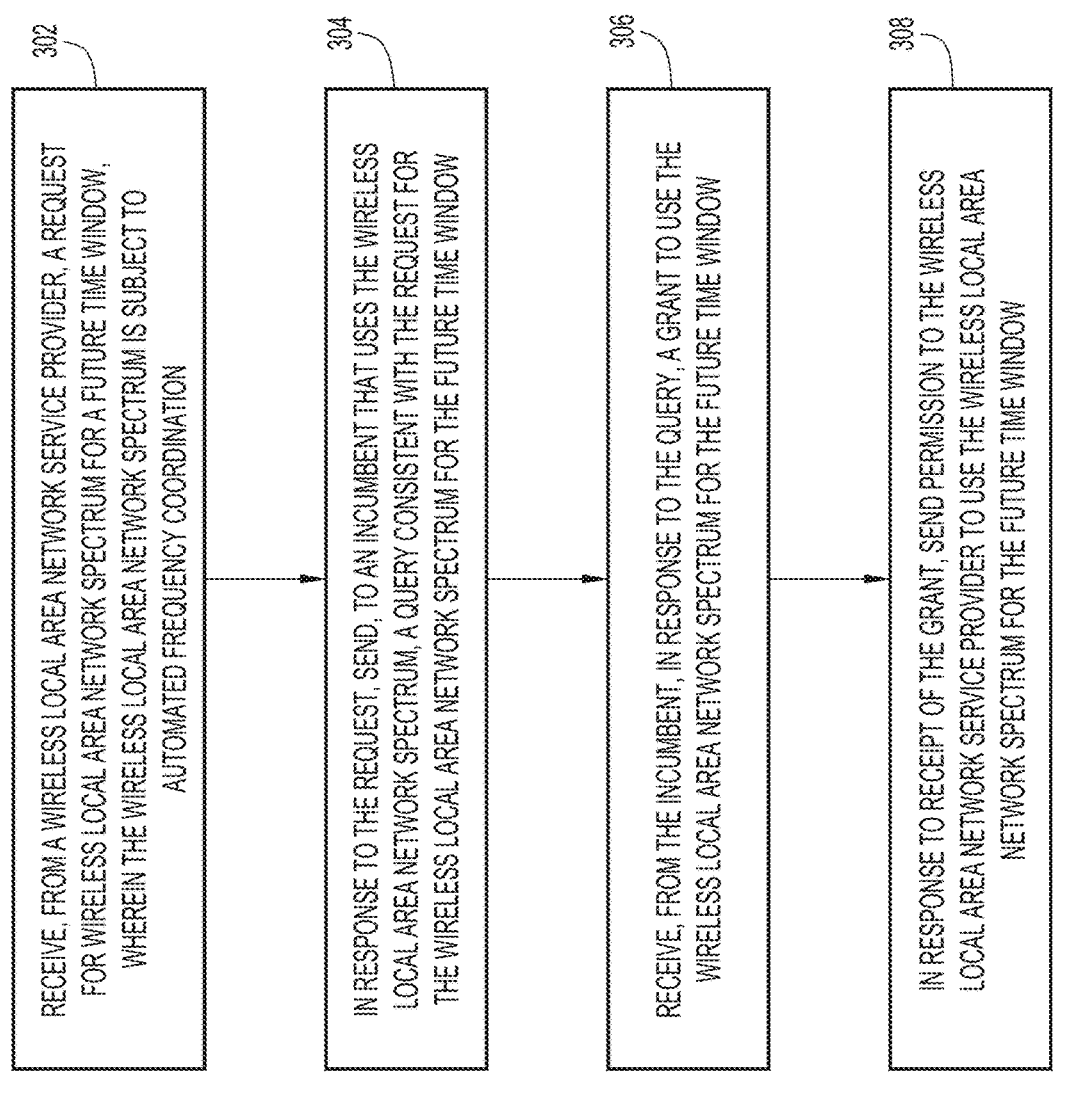

302

RECEIVE, FROM A WIRELESS LOCAL AREA NETWORK SERVICE PROVIDER, A REQUEST FOR WIRELESS LOCAL AREA NETWORK SPECTRUM FOR A FUTURE TIME WINDOW, WHEREIN THE WIRELESS LOCAL AREA NETWORK SPECTRUM IS SUBJECT TO AUTOMATED FREQUENCY COORDINATION

304

IN RESPONSE TO THE REQUEST, SEND, TO AN INCUMBENT THAT USES THE WIRELESS LOCAL AREA NETWORK SPECTRUM, A QUERY CONSISTENT WITH THE REQUEST FOR THE WIRELESS LOCAL AREA NETWORK SPECTRUM FOR THE FUTURE TIME WINDOW

306

RECEIVE, FROM THE INCUMBENT, IN RESPONSE TO THE QUERY, A GRANT TO USE THE WIRELESS LOCAL AREA NETWORK SPECTRUM FOR THE FUTURE TIME WINDOW

308

IN RESPONSE TO RECEIPT OF THE GRANT, SEND PERMISSION TO THE WIRELESS LOCAL AREA NETWORK SERVICE PROVIDER TO USE THE WIRELESS LOCAL AREA NETWORK SPECTRUM FOR THE FUTURE TIME WINDOW

FIG.3

AUTOMATED FREQUENCY COORDINATION (AFC) NEGOTIATED BAND ACCESS

TECHNICAL FIELD

The present disclosure relates to frequency allocation for wireless communication operations.

BACKGROUND

There has been an explosion in growth in the use of, and requirements for, consumer wireless data communications, particularly by individual users operating, for example, through licensed mobile network operators. This growth continues as the number and types of wireless devices employed by the individual users to access wireless networks via various communication paths continue to multiply, increasing demand for available spectrum. Available spectrum, however, is not infinite. Indeed, there is a finite amount of spectrum that can be tapped to support consumer wireless data communication.

In this regard, Wi-Fi 6E is an upcoming standard for an extension of Wi-Fi 6 (more formally known as IEEE 802.11ax), enabling the operation of features in the unlicensed 6 GHz band, in addition to the currently supported 2.4 GHz and 5 GHz bands. More specifically, Wi-Fi 6E operates in a 1200 MHz allocation of newly-available spectrum in the 6 GHz band. While this new band opens up significant new opportunities for Wi-Fi, use of this band comes with certain limitations.

Specifically, the Federal Communications Commission (FCC) has defined two radio modes which may use this allocation of the 6 GHz band: (1) Standard-Power Indoor (SPI) Access Point (AP), according to which the AP is permitted for both indoor and outdoor use and transmits at a maximum EIRP of 36 dBm, and Low-Power Indoor (LPI) APs, according to which the AP is intended only for indoor use and transmits at a maximum EIRP of 30 dBm.

Because many incumbents currently use this 1200 MHz allocation of the 6 GHz band, the FCC has mandated an interference mitigation system, called Automated Frequency Coordination (AFC), to protect these incumbents. According to the FCC, prior to transmitting, an SPI radio (e.g., an AP) must first consult an AFC database to ensure the radio is compliant and will not interfere with an incumbent. If an incumbent exists, the radio is not permitted to transmit at the maximum EIRP, but must reduce its power to reduce the chance of interference, thereby greatly reducing the range of the radio (AP).

BRIEF DESCRIPTION OF THE DRAWINGS

FIG. 2 illustrates one possible implementation of a database to support AFC and negotiated spectrum use logic, according to an example embodiment.

FIG. 3 shows a series of operations that may be executed by AFC and negotiated spectrum use logic, according to an example embodiment.

DETAILED DESCRIPTION

Overview

Figure 1:
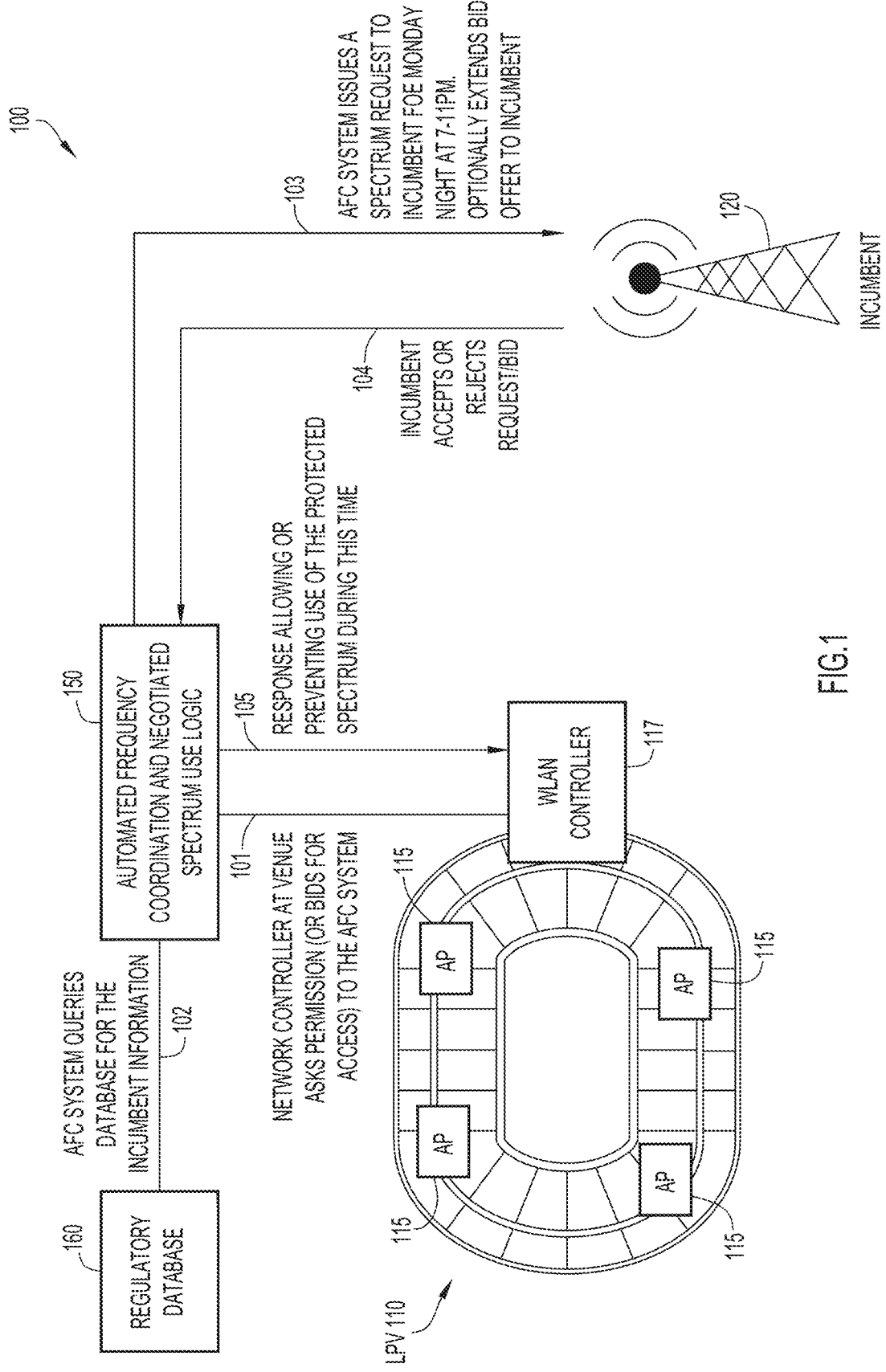
FIG. 1 shows a network including automated frequency coordination (AFC) and negotiated spectrum use logic, according to an example embodiment.

Presented herein are techniques to allocate use of controlled wireless spectrum. A method includes receiving, from a wireless local area network service provider, a request for wireless local area network spectrum for a future time window, wherein the wireless local area network spectrum is subject to automated frequency coordination, in response to the request, sending, to an incumbent that uses the wireless local area network spectrum, a query consistent with the request for the wireless local area network spectrum for the future time window, receiving, from the incumbent, in response to the query, a grant to use the wireless local area network spectrum for the future time window, and in response to receiving the grant, sending permission to the wireless local area network service provider to use the wireless local area network spectrum for the future time window.

In another embodiment, a device is provided. The device includes an interface configured to enable network communications, a memory, and one or more processors coupled to the interface and the memory, and configured to: receive, from a wireless local area network service provider, a request for wireless local area network spectrum for a future time window, wherein the wireless local area network spectrum is subject to automated frequency coordination, in response to the request, send, to an incumbent that uses the wireless local area network spectrum, a query consistent with the request for the wireless local area network spectrum for the future time window, receive, from the incumbent, in response to the query, a grant to use the wireless local area network spectrum for the future time window, and in response to receipt of the grant, sending permission to the wireless local area network service provider to use the wireless local area network spectrum for the future time window.

EXAMPLE EMBODIMENTS

Although a portion of the 6 GHz band is being made available for extended wireless local area network (WLAN) (e.g., Wi-Fi) use in accordance with IEEE 802.11ax, portions of that band may already be allocated to, or used by, incumbents. Thus, as noted, the FCC has mandated an interference mitigation system, called Automated Frequency Coordination (AFC), to protect these incumbents. According to FCC regulations, prior to transmitting, an SPI radio (e.g., an AP, or its proxy such as a controller) must first consult an AFC regulatory database to ensure the SPI radio is compliant and will not interfere with an incumbent. If an incumbent exists, the radio is not permitted to transmit at the maximum EIRP, but, instead, must reduce its power to reduce the chance of interference, thereby greatly reducing the range of the AP.

In Large Public Venues (LPVs), which may be near an incumbent (e.g., a public sector installation that is already using a given frequency or channel), limited AP power usage can pose significant challenges. This is especially true in the case of LPVs because many of the APs in these venues are outdoors, including open-air stadiums, parking lots, public areas of the venue, etc. In such cases, if the venue is near an incumbent, the WLAN service provider for the LPV may not be able to use the 6 GHz spectrum at the desired (maximum) output power.

That said, many LPVs may only have a need for enhanced spectrum use during relatively short intervals, i.e., during a sporting event or concert event when the venue is actually in use with thousands of attendees. Moreover, such enhanced spectrum demand is often only during evenings or weekends, such that, depending on the nature of the use of the spectrum by the incumbent, the chance of actually interfering with the incumbent during such events may be very limited.

Embodiments described herein provide a mechanism for, e.g., large public venues to gain access to the AFC-protected 6 GHz band used by incumbents, for short periods of time.

As will be explained in detail below, example embodiments expand the value and adoption of AFC, allowing the FCC or a third party to play an enhanced role in partnership with incumbents. The example embodiments also provide a way to harvest existing spectrum that may not be used regularly by incumbents, allowing better optimization of spectrum, and, potentially, a revenue sharing scheme between interested parties.

Reference is now made to the drawings, beginning with FIG. 1, which shows a network 100 including automated frequency coordination (AFC) and negotiated spectrum use logic 150, according to an example embodiment. More specifically, network 100 comprises an LPV 110, such as an outdoor stadium. The LPV 110 has one or more AP 115 located in desired locations to provide optimized coverage of one or more areas (or surrounding areas) of LPV 110. APs 115 may be controlled by a WLAN controller 117, which may, in certain situations, act as a proxy for APs 115. An incumbent spectrum user 120 is depicted by an antenna that transmits/receives at, e.g., frequencies in the 1200 MHz allocation of the 6 GHz band that may be desired for use by LPV 110 during predefined days and/or times.

According to FCC regulations, when there is a desire to operate in the 6 GHz band an AP 115 (or a proxy device, such as WLAN controller 117) is required, prior to transmitting, to first consult AFC and negotiated spectrum use logic 150, which, in turn, examines a regulatory database 160 to determine if an incumbent (e.g., incumbent spectrum user 120) exists in the same area. If an incumbent is present, AP 115 must either select a different channel (unused by an incumbent), or AP 115 must lower its transmit power. This check, mandated by FCC regulations for the 6 GHz band, must be made every 24 hours. Those skilled in the art will appreciate that the AFC applied to the 6 GHz band is merely an example, and other bands and frequencies could also be controlled under AFC, and benefit from the methodologies described herein.

In the present embodiments, AFC and negotiated spectrum use logic 150 is configured to process queries from an AP 115 or a WLAN controller 117, in concert with regulatory database 160, consistent with the FCC regulations. AFC and negotiated spectrum use logic 150 and regulatory database 160 may be hosted by a computing device 400 like that shown in FIG. 4.

As will be explained further below, AFC and negotiated spectrum use logic 150 is configured to enable LPV 110 (or other entity, e.g., a WLAN service provider that serves LPV 110) to request access to a channel in the protected portion of the 6 GHz band for a set period of time. AFC and negotiated spectrum use logic 150 is also configured to enable LPV 110 (or other entity) to enter into negotiations with incumbent spectrum user 120 to provide compensation (i.e., a monetary fee) for limited access to spectrum allocated to incumbent spectrum user 120.

A sequence of operations is now described that implements negotiated spectrum use according to an example embodiment. As shown in FIG. 1, at 101, LPV 110, or, e.g., WLAN controller 117, or, e.g., a WLAN service provider, issues a request to AFC and negotiated spectrum use logic 150, asking for permission to use a given channel(s) or spectrum, which may currently be in use by incumbent spectrum user 120. WLAN controller 117 may use an open API format made available by AFC and negotiated spectrum use logic 150. The request for permission provides specific co-ordinates where the spectrum is desired (i.e., in and around LPV 110), along with the date, time, and duration of when the spectrum is desired to be used. Optionally, the request may also include a bid for the spectrum, offering to lease or rent the spectrum during this period of time.

FIG. 2 illustrates one possible implementation of a database 200 to support AFC and negotiated spectrum use logic 150, according to an example embodiment. As shown, database 200 may keep track of a request 210, which may include, e.g., a frequency channel (or other spectrum specification), requestor and/or location data, date and time period of desired use, and an optional bid.

Referring back to FIG. 1, at 102, AFC and negotiated spectrum use logic 150 queries, based on the requestor name and/or its location, regulatory database 160 to determine who the incumbent is for the requested channel or spectrum. Regulatory database 160 returns a name, identifier, an/or contact information for incumbent spectrum user 120.

At this point, database 200 may be updated to include the name, identifier, and/or contact information for incumbent spectrum user 120.

At 103, AFC and negotiated spectrum use logic 150 contacts incumbent spectrum user 120 using the found incumbent name (and/or contact information such as email address, IP address, etc.). Such communication may be via a webhook, an agreed upon application or API, or another mechanism, among other possible communication schemes. During this communication, AFC and negotiated spectrum use logic 150 provides to incumbent spectrum user 120 the information in request 210, plus, e.g., an identity of the requestor (i.e., LPV 110, or the WLAN service provider that serves LPV 110, in this case).

At 104, incumbent spectrum user 120 responds to the request 210 by granting or rejecting request 210. For example, if incumbent spectrum user 120 is not staffing a facility in the vicinity of LPV 110 for the day and time for which the request for spectrum is made, incumbent spectrum user 120 may grant access to the requested spectrum, as shown in FIG. 2. Incumbent spectrum user 120 may also respond with a counter bid, giving LPV 110 an opportunity to enter a back-and-forth negotiation over a mutually agreeable fee. It is noted that such a "counter" bid could also be a first fee offer to a request that did not initially contain a bid. It is also noted that a negotiation could be in connection with day or time, or a spectrum amount (e.g., a subset of the spectrum requested initially).

At 105, AFC and negotiated spectrum use logic 150 returns the grant, deny and/or counter bid response to LPV 110. If the request is granted, LPV 110 may use the requested spectrum at the future requested day/time. If the request was denied, then LPV 110 may not use the requested spectrum. And if the response suggests a counter bid, then LPV 110 may re-send the request with the counter bid amount, or some other amount, and initiate a further negotiation.

In one embodiment, regulatory database 160 is updated by AFC and negotiated spectrum use logic 150 to provide details indicating that the spectrum has been "borrowed" by LPV 110 during this period, but is still under the control of incumbent spectrum user 120.

It is noted that where multiple incumbents might control different portions of the 6 GHz spectrum subject to automated frequency coordination, LPV 110 or the appropriate WLAN service provider may send, or AFC and negotiated spectrum use logic 150 may be configured to send, a request for spectrum to each such incumbent. In such a scenario, it is possible that one or more of the incumbents will grant access to the controlled spectrum, and LPV 110 may choose to "borrow" an optimized combination of granted spectrum (where the optimization may be based on cost, bandwidth, available time, etc.).

Thus, those skilled in the art will appreciate that the embodiments described herein enable a LPV or other entity that might desire the use of protected spectrum to request access to an AFC band for a set period of time. The LPV can enter into negotiations to provide compensation for limited access. In this way, AFC and negotiated spectrum use logic 150 may broker access to incumbent spectrum.

FIG. 3 shows a series of operations that may be executed by automated frequency coordination and negotiated spectrum use logic, according to an example embodiment. At 302, an operation includes receiving, from a wireless local area network service provider, a request for wireless local area network spectrum for a future time window, wherein the wireless local area network spectrum is subject to automated frequency coordination. At 304, an operation includes in response to the request, sending, to an incumbent that uses the wireless local area network spectrum, a query consistent with the request for the wireless local area network spectrum for the future time window. At 306, an operation includes receiving, from the incumbent in response to the query, a grant to use the wireless local area network spectrum for the future time window. And at 308, an operation includes in response to receiving the grant, sending permission to the wireless local area network service provider to use the wireless local area network spectrum for the future time window.

Figure 4:
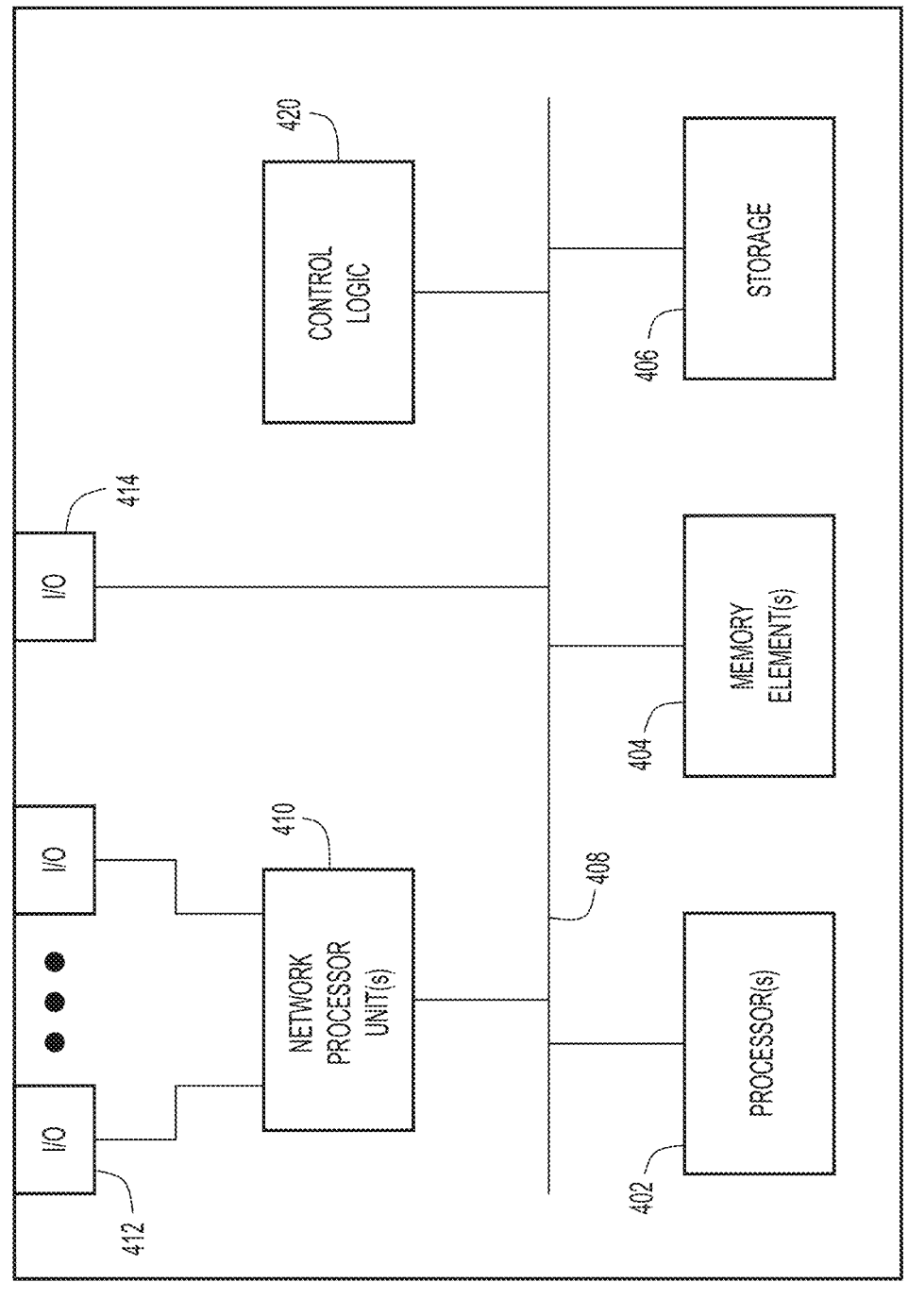
FIG. 4 is a block diagram of a computing device, server, etc., that may be configured to host AFC and negotiated spectrum use logic and perform the techniques described herein, according to an example embodiment.

FIG. 4 is a block diagram of a computing device, server, etc., that may be configured to host automated frequency coordination (AFC) and negotiated spectrum use logic 150 and perform the techniques described herein, according to an example embodiment.

In various embodiments, a computing device, such as computing device 400 or any combination of computing devices 400, may be configured as any entity/entities as discussed for the techniques depicted in connection with FIGS. 1-3 in order to perform operations of the various techniques discussed herein.

In at least one embodiment, the computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420 (which could include, for example, AFC and negotiated spectrum use logic 150). In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 (wired and/or wireless) to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, any other I/O port(s), and/or antenna(s)/ antenna array(s) now known or hereafter developed. Thus, the network processor unit(s) 410 and/or network I/O interface(s) 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment a method is provided. The method may include receiving, from a wireless local area network service provider, a request for wireless local area network spectrum for a future time window, wherein the wireless local area network spectrum is subject to automated frequency coordination, in response to the request, sending, to an incumbent that uses the wireless local area network spectrum, a query consistent with the request for the wireless local area network spectrum for the future time window, receiving, from the incumbent, in response to the query, a grant to use the wireless local area network spectrum for the future time window, and in response to receiving the grant, sending permission to the wireless local area network service provider to use the wireless local area network spectrum for the future time window.

The method may further include querying, based on a location at which the wireless local area network spectrum for the future time window is to be used, a regulatory database to identify the incumbent.

The method may further include sending the request to multiple incumbents.

The method may further include including, in the request, a monetary bid for of the wireless local area network spectrum for the future time window.

In the method, the wireless local area network spectrum for the future time window may be in a 6 GHz frequency band.

In the method, the wireless local area network spectrum may be used for communication in accordance with IEEE 802.11ax.

The method may further include receiving the request from a wireless local area network controller.

The method may further include receiving the request from a large public venue.

The method may further include receiving a counter bid from the incumbent, the counter bid being indicative of a fee for granting the request.

The method may further include receiving a counter bid from the incumbent, the counter bid being indicative of an offer for a different spectrum amount, a different day, and/or a different time period.

A device may also be provided. The device may include an interface configured to enable network communications, a memory, and one or more processors coupled to the interface and the memory, and configured to: receive, from a wireless local area network service provider, a request for wireless local area network spectrum for a future time window, wherein the wireless local area network spectrum is subject to automated frequency coordination, in response to the request, send, to an incumbent that uses the wireless local area network spectrum, a query consistent with the request for the wireless local area network spectrum for the future time window, receive, from the incumbent, in response to the query, a grant to use the wireless local area network spectrum for the future time window, and in response to receipt of the grant, sending permission to the wireless local area network service provider to use the wireless local area network spectrum for the future time window.

In the device, the one or more processors may be further configured to query, based on a location at which the wireless local area network spectrum for the future time window is to be used, a regulatory database to identify the incumbent.

In the device, the one or more processors may be further configured to send the request to multiple incumbents that use the wireless local area network spectrum.

In the device, the one or more processors may be further configured to include, in the request, a monetary bid for of the wireless local area network spectrum for the future time window.

In connection with the device, the wireless local area network spectrum for the future time window may be in a 6 GHz frequency band.

In connection with the device, the wireless local area network spectrum may be used for communication in accordance with IEEE 802.11ax.

In still another embodiment, there is provided one or more non-transitory computer readable storage media encoded with instructions that, when executed by a processor, cause the processor to: receive, from a wireless local area network service provider, a request for wireless local area network spectrum for a future time window, wherein the wireless local area network spectrum is subject to automated frequency coordination, in response to the request, send, to an incumbent that uses the wireless local area network spectrum, a query consistent with the request for the wireless local area network spectrum for the future time window, receive, from the incumbent, in response to the query, a grant to use the wireless local area network spectrum for the future time window, and in response to receipt of the grant, sending permission to the wireless local area network service provider to use the wireless local area network spectrum for the future time window.

The instructions may be further configured to cause the processor to query, based on a location at which the wireless local area network spectrum for the future time window is to be used, a regulatory database to identify the incumbent.

The instructions may be further configured to cause the processor to send the request to multiple incumbents that use the wireless local area network spectrum.

The instructions may be further configured to cause the processor to include, in the request, a monetary bid for of the wireless local area network spectrum for the future time window.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving, from a wireless local area network service provider, a request for wireless local area network spectrum for a future time window, wherein the wireless local area network spectrum is subject to automated frequency coordination;
in response to the request, sending, to an incumbent that uses the wireless local area network spectrum, a query consistent with the request for the wireless local area network spectrum for the future time window;
receiving, from the incumbent, in response to the query, a tentative grant to use the wireless local area network spectrum for the future time window, wherein the tentative grant includes a counter bid to a bid included in the request;
in response to receiving the tentative grant, sending tentative permission to the wireless local area network service provider to use the wireless local area network spectrum for the future time window; and
granting a combination of wireless local area network spectrum to the wireless local area network service provider, wherein the combination of wireless local area network spectrum includes both the wireless local area network spectrum for which the tentative grant was received and other wireless local area network spectrum used by another incumbent.

2. The method of claim 1, further comprising, querying, based on a location at which the wireless local area network spectrum for the future time window is to be used, a regulatory database to identify the incumbent.

3. The method of claim 1, further comprising sending the request to multiple incumbents.

4. The method of claim 1, further comprising, including, in the request, a monetary bid for the wireless local area network spectrum for the future time window.

5. The method of claim 1, wherein the wireless local area network spectrum for the future time window is in a 6 GHz frequency band.

6. The method of claim 1, wherein the wireless local area network spectrum is used for communication in accordance with IEEE 802.11ax.

7. The method of claim 1, further comprising receiving the request from a wireless local area network controller.

8. The method of claim 1, further comprising receiving the request from a large public venue.

9. The method of claim 1, wherein the counter bid indicates a fee for granting the request.

10. The method of claim 1, wherein the counter bid includes an offer for a different spectrum amount, a different day, and/or a different time period.

11. A device comprising:
an interface configured to enable network communications;
a memory; and
one or more processors coupled to the interface and the memory, and configured to:
receive, from a wireless local area network service provider, a request for wireless local area network spectrum for a future time window, wherein the wireless local area network spectrum is subject to automated frequency coordination;
in response to the request, send, to an incumbent that uses the wireless local area network spectrum, a query consistent with the request for the wireless local area network spectrum for the future time window;
receive, from the incumbent, in response to the query, a tentative grant to use the wireless local area network spectrum for the future time window, wherein the tentative grant includes a counter bid to a bid included in the request;
in response to receipt of the tentative grant, sending tentative permission to the wireless local area network service provider to use the wireless local area network spectrum for the future time window; and
grant a combination of wireless local area network spectrum to the wireless local area network service provider, wherein the combination of wireless local area network spectrum includes both the wireless local area network spectrum for which the tentative grant was received and other wireless local area network spectrum used by another incumbent.

12. The device of claim 11, wherein the one or more processors are further configured to query, based on a location at which the wireless local area network spectrum for the future time window is to be used, a regulatory database to identify the incumbent.

13. The device of claim 11, wherein the one or more processors are further configured to send the request to multiple incumbents that use the wireless local area network spectrum.

14. The device of claim 11, wherein the one or more processors are further configured to include, in the request, a monetary bid for the wireless local area network spectrum for the future time window.

15. The device of claim 11, wherein the wireless local area network spectrum for the future time window is in a 6 GHz frequency band.

16. The device of claim 11, wherein the wireless local area network spectrum is used for communication in accordance with IEEE 802.11ax.

17. One or more non-transitory computer readable storage media encoded with instructions that, when executed by a processor, cause the processor to:

receive, from a wireless local area network service provider, a request for wireless local area network spectrum for a future time window, wherein the wireless local area network spectrum is subject to automated frequency coordination;

in response to the request, send, to an incumbent that uses the wireless local area network spectrum, a query consistent with the request for the wireless local area network spectrum for the future time window;

receive, from the incumbent, in response to the query, a tentative grant to use the wireless local area network spectrum for the future time window, wherein the tentative grant includes a counter bid to a bid included in the request;

in response to receipt of the tentative grant, sending tentative permission to the wireless local area network service provider to use the wireless local area network spectrum for the future time window; and grant a combination of wireless local area network spectrum to the wireless local area network service provider, wherein the combination of wireless local area network spectrum includes both the wireless local area network spectrum for which the tentative grant was received and other wireless local area network spectrum used by another incumbent.

18. The one or more non-transitory computer readable storage media of claim 17, wherein the instructions are further configured to cause the processor to query, based on a location at which the wireless local area network spectrum for the future time window is to be used, a regulatory database to identify the incumbent.

19. The one or more non-transitory computer readable storage media of claim 17, wherein the instructions are further configured to cause the processor to send the request to multiple incumbents that use the wireless local area network spectrum.

20. The one or more non-transitory computer readable storage media of claim 17, wherein the instructions are further configured to cause the processor to include, in the request, a monetary bid for the wireless local area network spectrum for the future time window.

* * * * *